(12) United States Patent
Byers

(10) Patent No.: US 6,219,645 B1
(45) Date of Patent: Apr. 17, 2001

(54) ENHANCED AUTOMATIC SPEECH RECOGNITION USING MULTIPLE DIRECTIONAL MICROPHONES

(75) Inventor: Charles Calvin Byers, Aurora, IL (US)

(73) Assignee: Lucent Technologies, Inc., Murray Hil, NJ (US)

( * ) Notice: Subject to any disclaimer, the term of this patent is extended or adjusted under 35 U.S.C. 154(b) by 0 days.

(21) Appl. No.: 09/453,113

(22) Filed: Dec. 2, 1999

(51) Int. Cl.[7] .................................................. G10L 15/02
(52) U.S. Cl. ............................ 704/275; 704/231; 381/91
(58) Field of Search ................................... 704/270, 275, 704/231; 381/91, 92, 355, 356

(56) References Cited

U.S. PATENT DOCUMENTS

| | | | |
|---|---|---|---|
| 5,561,737 | * 10/1996 | Bowen | 704/275 |
| 5,583,965 | * 12/1996 | Douma et al. | 704/275 |
| 5,657,425 | * 8/1997 | Johnson | 704/275 |
| 5,774,841 | * 6/1998 | Salazar et al. | 704/225 |
| 5,828,997 | * 10/1998 | Durlach et al. | 704/233 |
| 6,014,626 | * 1/2000 | Cohen | 704/275 |
| 6,052,666 | * 4/2000 | Diehl et al. | 704/275 |

OTHER PUBLICATIONS

Web Site printout, Georg Neumann GmbH, Berlin, KLU 100 Dummy Head microphone (15 pgs).
Web Site printout, Sensory, Inc., Sunnyvale, CA, (2 pgs).
Web Site printout, Wizzard Software, Pittsburgh, PA (3 pgs).
Web Site printout, IBM Software, "ViaVoice"(2 pgs).
Web Site printout, Philips Electronics, "PSP—Professional Solutions—Voice Control" (2 pgs).
Texas Instruments, *TMS320 DSP Produce Family*—Glossary, Feb. 1998, pp. I–117.
Web Site printout, Analog Devices Product Page: ADSP–21065L; Products and Datasheets (4 pgs).
Web Site printout, Texas Instruments, "DSP Overview at Texas Instruments" (2 pgs).
Web Site printout, Analog Devices Product p.: SSM2250; Product p.: AD 1877; Product p. 1879; Products and Datasheets (8 pgs).
Web Site printout, Telex Computer "Audio—Microphones & Headsets for speech dictation" (3 pgs).
Web Site printout, Shure Brothers Inc. "Shure SM89 Shotgun Condenser Microphone" (5 pgs).
Analog Devices Data Sheet, DSP Microcomputers, ADSP–21msp58/59, 1995, pp. 1–40.

* cited by examiner

*Primary Examiner*—David Hudspeth
*Assistant Examiner*—Abul K. Azad
(74) *Attorney, Agent, or Firm*—Sitrick & Sitrick

(57) ABSTRACT

A method and system for simultaneously controlling a plurality of automatic speech recognition (ASR) systems within the working volume of a room, or for controlling multiple devices as a single unified ASR system. Multiple microphones feed a signal processing system which determines or estimates both a user's location and a user's orientation within a room as the user issues voice commands, and further determines the microphone providing the best signal. Diversity noise cancellation may be further applied to the microphone signals. Based on the apparent direction the user is facing, the system may then enable one of the ASR systems for voice command recognition and/or execution of voice commands. The invention reduces the number of false command executions and improves the performance, accuracy, and ease of use of voice control.

43 Claims, 8 Drawing Sheets

ENHANCED AUTOMATIC SPEECH RECOGNITION USING MULTIPLE DIRECTIONAL MICROPHONES

RELATED APPLICATIONS

None.

FEDERALLY SPONSORED RESEARCH OR DEVELOPMENT

Not Applicable.

BACKGROUND OF THE INVENTION

This invention relates to voice control of electronic devices, control of a number of distributed processing systems, multi-pickup sensing apparatus, and to triangulation of a user's position.

Voice control of various electronic devices and networks is becoming more prevalent. Advances in signal processing hardware and algorithms are making it possible to build automatic speech recognition (ASR) voice response systems with larger vocabularies and higher accuracy. Also, inexpensive, highly integrated microelectronic circuitry is enabling the inclusion of simple voice response systems in many classes of low cost consumer products, including appliances, entertainment systems, voice-dialing telephones such as the GENIE(™) GSM cellular telephone by Phillips Electronics in the Netherlands, and toys such as FURBY(™) by Tiger Electronics of China Manufacturers of such microelectronic circuitry include Lucent, Motorola, Texas Instruments, and others, and general purpose microprocessor manufacturers like Intel, Motorola, IBM, and AMD.

Today's ASR-based voice response systems all use a single signal input that is picked up by a single microphone, processed by a signal processor or other processing means to extract the speech features, and sent through a recognition algorithm that matches the input signals with stored templates or models. The controlled device then uses the output of the match algorithm to control some aspect of its operation. Examples of today's voice response systems include interactive computer games and dictation software packages available for personal computers at any computer retailer, and products available from Lucent, such as Service Circuit System and Compact Service Node.

Several limitations exist with current implementations of ASR voice response systems. Current implementations are very susceptible to errors caused by ambient sound noise interfering with the speech. The microphone picks up ambient sounds in addition to the voice signal of interest. The voice recognition algorithms use voice models that assume a pure voice sound. Mixing ambient noise with the desired pure signal leads to reduced accuracy of the algorithm.

Special microphones are usually mounted quite close to the user's mouth on head-mounted booms are often employed to lessen ambient noise effects. Head mounted booms are sold by specialty telephone retailers, computer stores, microphone manufacturers including Shure Brothers, and are available at mass market retailers including RADIO SHACK(™) stores, a division of Tandy Corp., in Fort Worth, Tex. Current art uses many techniques, such as moving the microphone closer to the source (as a boom microphone does), using highly directional microphones, and using soundproof rooms to contain the speaking.

Another limitation of the present art is that only a single ASR device can be used at a time. If a user has several ASR devices in use simultaneously, for example a computer, telephone, and intelligent home controller, it may be necessary to switch microphones often in order to talk to and therefore control the desired ASR device.

Since most head mounted microphones currently in use for ASR are corded (again to reduce interference and noise pickup), the user often feels tethered to the electronics box, hampering mobility through a room on environment.

SUMMARY OF THE INVENTION

A solution to all of the problems in the current art involves using an array of microphones spread throughout the working volume of a room. All of these microphones are fixed in location to the walls and furniture. Their signals are all directed to a signal processing circuit that compares the amplitude, frequency content, and phase of the signals picked up from the various microphones, and decides the location of the user, and also estimates the user's head orientation.

Diversity noise cancellation techniques improve the signal to noise ratio of the post-processed signal by choosing which microphone(s) are providing the highest quality audio before passing it on to the ASR algorithm.

A new control mode is possible using a diversity microphone configuration, wherein the user is surrounded by several devices that can accept voice inputs. Using the present invention, the user would turn directly to face the device to be controlled, and speak the command. Only the device that is in alignment with the direction the user was facing would respond to the voice command.

Advantageously, the directional ASR system reduces the number of false command executions caused by the user saying command keywords in normal speech, because voice commands would only execute to completion if the user were facing a particular device to within a small, programmable angle tolerance.

Also advantageously, the system of the present invention greatly improves the performance and accuracy of voice control by reducing the size of the recognition vocabulary required by the ASR algorithms.

These and other aspects and attributes of the present invention will be discussed with reference to the following drawings and accompanying specification.

DETAILED DESCRIPTION OF THE PREFERRED EMBODIMENT

Figure 1:
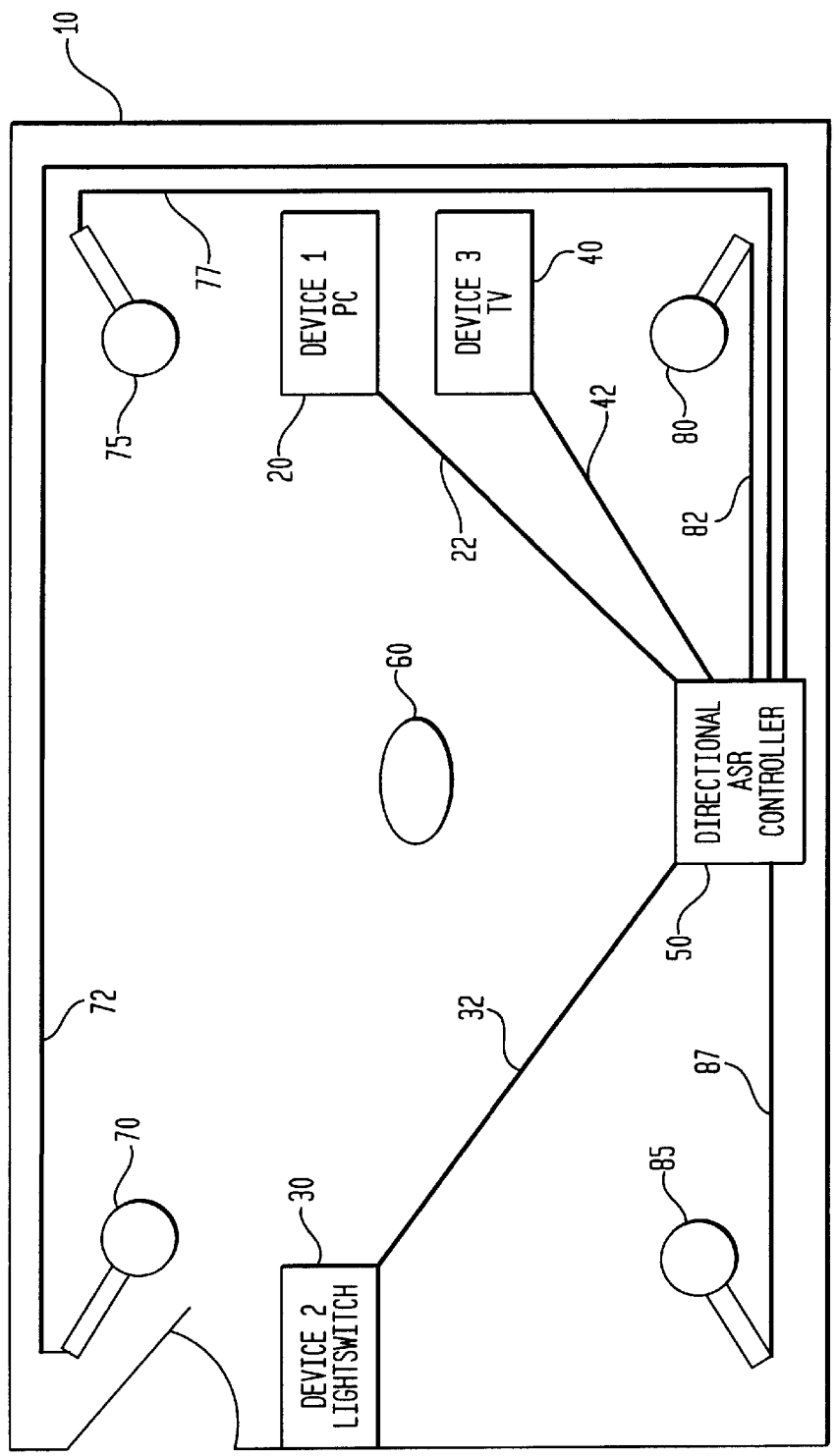
FIG. 1 shows a block diagram of plan drawing of a typical installation in accordance with the present invention.

While this invention is susceptible of embodiment in many different forms, there is shown in the drawings, and will be described herein in detail, specific embodiments thereof with the understanding that the present disclosure is to be considered as an exemplification of the principles of the invention and is not intended to limit the invention to the specific embodiments illustrated.

In accordance with one aspect of the present invention, an array of microphones spread throughout the working volume of a room. Each microphone in the array is the same kind of microphone as used in sound recording. Preferably, a microphone should have a flat or nearly flat frequency response throughout the voice frequency range, and should have adequate sensitivity and dynamic range to pick up a human speaking voice at ranges typical for the room in which is utilized.

In the preferred embodiment, the microphones have a unidirectional pattern to permit a chosen number of microphones to evenly cover the active volume in a room. Also, in a preferred embodiment, the microphones all have the same frequency response, sensitivity, range, and directional pattern so that the system of the present invention does not have to compensate for differences in the microphones as it must where the microphones do not have consistent characteristics.

Directional microphones are preferred to omnidirectional microphones for the simple reason that omnidirectional microphones can pick up signals or sonic paths that are reflected from behind the omnidirectional microphone, thus potentially indicating to the system that the sonic path associated with the reflected sound path is longer than the true distance from the user to the microphone.

Microphones are fixed in location such as via attachment to the walls and furniture. In one embodiment, the microphones are deployed in one predetermined pattern selected from a small catalog of options. One such option positions a microphone at each location that may be the target of a voice command. Another option positions a microphone at each of the corners of the room. Another option positions a microphone at the center of each of the walls in a room. Other options may include variations to account for irregular room shapes, doors, windows, and internal obstructions. For a given room, there are optimum ways to arrange the microphones, and less-than-optimal ways. Performance and accuracy will vary accordingly.

In a preferred embodiment of the present invention, the user places microphones in fixed locations on the walls and furniture, and then instructs the system as to the location of placed microphones. The instruction can take the form of manually entering location coordinates, using a text editor program, for each of the microphones. In one embodiment, the coordinates are entered in numerical form relative to an origin within the room. In an alternate embodiment, the instruction may take the form of a drawing on a graphical scale representation of the room on a computer screen, using graphical user interface software tools provided with the system, and then the user indicating on the scale representation the location of the microphones.

The microphones are coupled to the controller of the present invention via cables or wireless transmission and reception. Each microphone connected comprises a channel of audio input to the system, providing audio input signals. Conventional shielded metallic cables are used in typical installations. Since the location of microphones are fixed in operation, there is generally labor involved in permanently routing and hiding the wires. Wireless transmission and reception are used in high-end installations because they eliminate the need to run many unsightly cords along the baseboard or other areas, but wireless solutions are more expensive, and the transmitters consume batteries which lends additional operating cost to the system.

FIG. 1 shows a block diagram of a plan drawing of a typical installation in accordance with the present invention within a single room 10. Within the room 10 are a plurality of devices 20, 30, 40 to be controlled. In the illustrated embodiment, the plurality of devices 20, 30, 40 comprise respectively a personal computer (PC) device 20, a light switch device 30, and a television (TV) device 40. Generally, the plurality of devices include any number of systems or subsystems that are to be controlled via voice commands, such as but not limited to telephones, kitchen and household appliances and systems, and other consumer electronic devices.

A directional automatic speech recognition (ASR) controller 50 is coupled to the devices 20, 30, 40 by respective device communications links 22, 32, 42. The device communications links may be wired or wireless. Examples of common device communications links appropriate in some embodiments include, but are not limited to, electrical wires (e.g., a serial interface, a parallel interface, Small Computer Systems Interface (SCSI), Universal Serial Bus (USB), IEEE 1394, CEBus, X.10, or conventional local area network (LAN)), radio frequency (RF), infrared (IR), optical conduits or optical fibers, microwaves, and ultrasonic. The type of device communications link used may be different for each controlled device.

Also coupled to the directional ASR controller 50 are a plurality of microphones. In the illustrated embodiment, there are exactly four microphones 70, 75, 80, 85 arranged throughout the room 10. Each embodiment of the invention utilizes a fixed number of microphones, but the number of microphones may be different for each chosen embodiment. Alternate embodiments may contain more or less than four microphones.

In the illustrated embodiment, the coupling between the microphones 70, 75, 80, 85 and the directional ASR controller 50 is via respective microphone communications links 72, 77, 82, 87. Examples of common microphone communications links appropriate in some embodiments include those listed for common device communications links, above. The type of microphone communications link used may be different for each coupled microphone.

The directional ASR controller 50 need not be physically co-located in the same room 10 that contains the plurality of microphones. The directional ASR controller 50 may be located remotely from the room 10, or may have part of the controller 50 located in the room and the remainder of the controller located remotely. In the illustrated embodiment, the directional ASR controller 50 is located within the room 10.

The devices 20, 30, 40 to be controlled need not be physically co-located in the same room 10 that contains the plurality of microphones. Each of the devices 20, 30, 40 may individually and respectively be located remotely from the room 10, or may have some portion of the device within the room and the remainder located remotely. In the illustrated embodiment, the devices 20, 30, 40 to be controlled are located within the room 10.

In the illustrated embodiment, the user 60 selects and turns to face the selected one of the devices to be controlled (20, 30, or 40), and speaks a command towards that selected device. The microphones 70, 75, 80, 85 each individually and respectively pick up or transduce the voice command into a microphone signal. Each of the microphones relays it's microphone signal via microphone communications links 72, 77, 82, 87 to the directional ASR controller 50. The directional ASR controller 50 interprets the plurality of microphone signals thus received and determines which direction the user was facing when the voice command was spoken. The directional ASR controller 50 then relays the appropriate command or signal to the selected controlled device.

For example in the illustrated embodiment, if the user 60 turns to face the light switch device 30 and speaks a voice command, the directional ASR controller 50 determines the user is facing the light switch and sends a signal to the light switch over device communications link 32, and none of the other devices 20, 40 receives a signal from the directional ASR controller 50.

In an operating mode of the present invention, all of the signals from each of the microphones are directed to a signal processing circuit that compares the amplitude, frequency content, and phase of the signals picked up from the various microphones, and decides the location of the user, and also estimates the user's head orientation. The signal processing circuit can select the microphone with the cleanest signal, e.g., using a digital signal processing technique to select the best of several spatially diverse sources.

Diversity noise cancellation techniques also can improve the signal to noise ratio of the post-processed signal by choosing which microphone(s) are providing the highest quality audio before passing it on to the ASR algorithm. Diversity noise cancellation techniques, as presently applied in the audio art, use a plurality of microphones located in close proximity to each other.

Examples of diversity noise cancellation techniques in the art include concert performances in which a performer sings into a first microphone attached to a stand that has a second microphone located directly below the first. The signal of the second microphone is then electronically subtracted from the signal of the first microphone, e.g., using a digital signal processor (DSP), resulting in an output of the system that is much more immune to ambient noise and feedback at high stage audio levels.

In a preferred embodiment, each microphone's signal is compared with a model of the human voice. The output of the microphone that has the best match with the model is passed on to the ASR algorithm. In an alternative embodiment, the system selects the microphone detecting the loudest signal and hence the loudest source.

The present invention provides an improved audio signal to ASR devices via signal processing of multiple inputs, diversity noise cancellation techniques, and the use of an array of inputs. The improved audio signal provides for a novel control mode. The user may be surrounded by several devices that can accept voice inputs. The same command word may be recognized by several of these devices. For example, the room lights, ceiling fan, TV and computer may all be programmed to respond to the word "off" by turning themselves off. Prior to the present invention, this could result in undesirable operation, as a command to turn the TV off would also extinguish the lights, halt the fan, and shutdown the computer. An alternative solution of the prior art is to supply a plurality of microphones, one for each device to be controlled, and the user would have to manually select which microphone to speak into. Further, the user would typically have to disable the other microphones in use to prevent stray commands from being recognized. With more than two or three ASR devices, the prior art solution quickly becomes intractable, as the user has to find and select the correct microphone from a pile of microphones.

The present invention permits a more natural control of ASR devices in a room. As an illustrative example of a more natural control method, consider an executive giving orders in a board room to subordinates. The executive faces each subordinate in turn and gives instructions. Each subordinate understands when he or she are being addressed, even when not addressed by name or position, because the executive is facing each one when speaking to him or her. A similar method or more natural control is automated in this invention.

Using the present invention, the user would turn directly to face the device to be controlled, and speak a voice command intended for that device, and that device alone.

Figure 2:
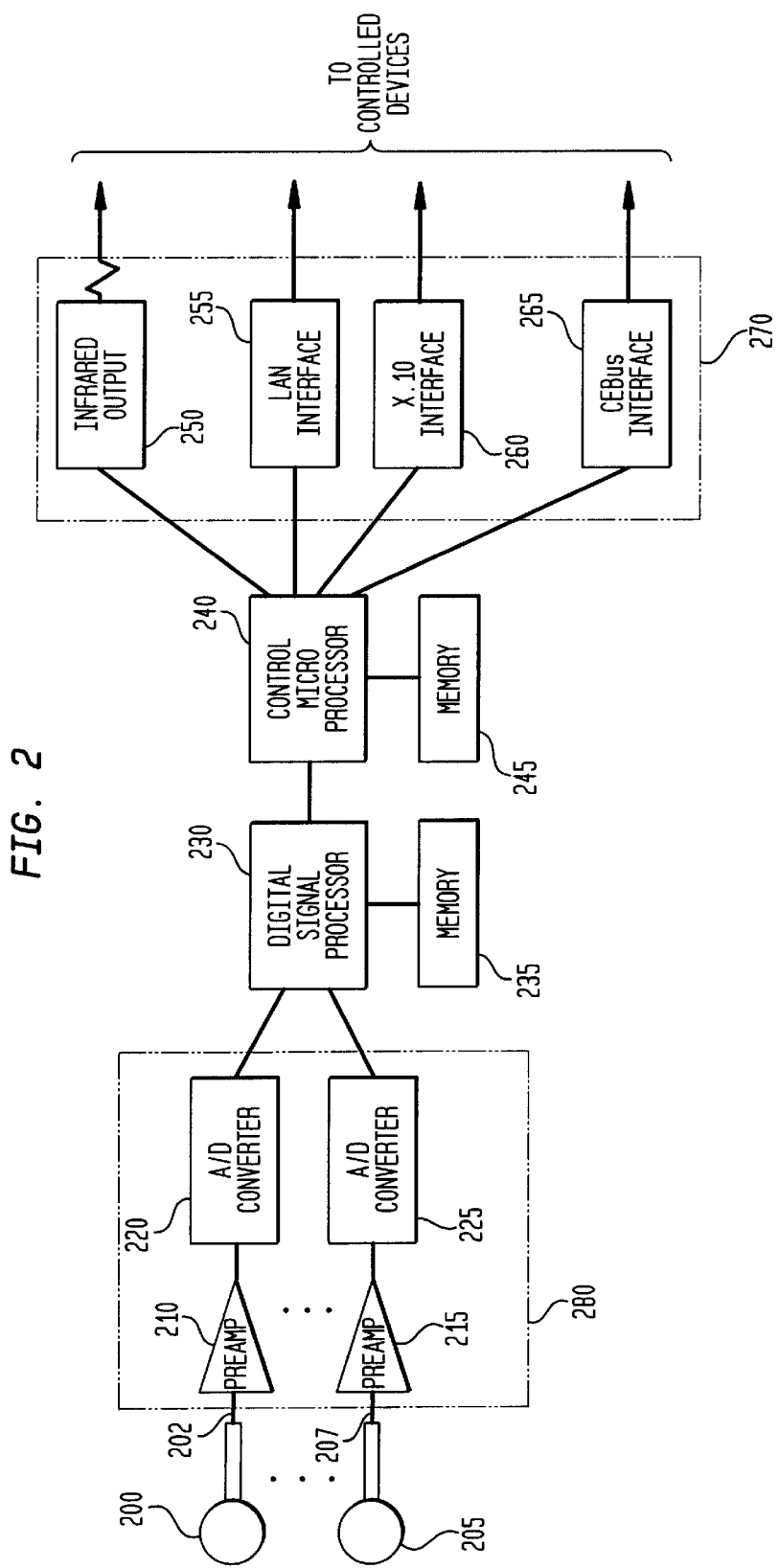
FIG. 2 is a block diagram of the directional ASR controller in accordance with the present invention.

FIG. 2 is a system block diagram of the directional ASR controller 50 in accordance with the present invention. A microphone 200 is coupled via a microphone communications link 202 to a signal conditioning and converting circuit. In the illustrated embodiment, the signal conditioning and converting circuit comprises a pre-amplifier 210 coupled to an analog to digital converter 220.

Microphone hardware is available from many vendors. Examples of such products include the model SM89 directional microphone, by Shure Brothers Inc. of Evanston, Ill.; and the ARIA(™) Desktop Dictation Microphone, by Telex Communications Inc. of Minneapolis, Minn.

Audio amplifiers, including integrated circuits performing amplifier functions, are available from a variety of vendors, including Amplifier Research of Souderton, Pa.; Analog Devices Inc. of Norwood, Mass.; Hitachi Semiconductor (America) Inc., of Sunnyvale, Calif. and Maxim Integrated Products, of Sunnyvale, Calif.

Integrated circuits performing as analog to digital converters are available from a variety of vendors, including Analog Devices Inc. of Norwood, Mass.; Harris Semiconductor of Melbourne, Fla.; Motorola Semiconductor of Tempe, Ariz.; Applied Signal Technology Inc. of Sunnyvale, Calif.; and Maxim Integrated Products, of Sunnyvale, Calif.

Another microphone 205 is similarly coupled to a pre-amplifier 215, which is coupled to an analog to digital converter 225. In a preferred embodiment, the structure shown for each one microphone is replicated once for each microphone used in that embodiment, comprising a signal conditioning and converting block 280.

Commercial software for consumer personal computers to perform speech recognition is readily available from many vendors. Examples of such products include NATURALLYSPEAKING(™) by Dragon Systems Inc. of Newton, Mass. Dictation Assistant by Wizzard Software Group of Pittsburgh, Pa.; VIAVOICE(™) 98 by IBM Corp. of Armonk, N.Y.; and Voice XPRESS(™) Professional of Lernout & Hauspie, in Burlington, Mass.

Hardware systems for performing speech recognition is available from many vendors. Example of such products include the RSC series of interactive speech integrated circuits, available from Sensory Inc. of Sunnyvale, Calif.

In the illustrated embodiment, the output of all of the signal conditioning and converting circuits (e.g., the outputs of analog to digital converters 220, 225) are each coupled to a digital signal processor (DSP) 230. The DSP 230 is coupled both to a memory 235 and to a general purpose control microprocessor 240. The DSP 230 performs signal processing on the digital samples that are output by the plurality of analog to digital converters coupled to it, responsive to programming stored in the memory 235 and commands from the control microprocessor 240.

DSP processors are available from a variety of vendors, including Analog Devices Inc. of Norwood, Mass., and Texas Instruments Inc., of Dallas, Tex. Some DSP processors, such as the model ADSP-21 msp58 integrated circuit of Analog Devices Inc., also include A/D functions in the same integrated circuit package, which can be used to reduce overall parts cost of the system in accordance with the present invention.

The control microprocessor 240 is coupled to a memory 245. The control microprocessor is responsive to the output of the DSP 230 and to the programming stored in the memory 240 for controlling the DSP 230 and for controlling the device interfaces 270. The device interfaces 270 comprise one or more interfaces for device communications links. In the illustrated embodiment, four communications links are indicated, including an infrared (IR) output interface 250, a local area network (LAN) interface 255, a X.10 device control interface 260, and a CEBus interface 265. Each of the device interfaces 270 is then coupled via device communications links to a respective device to be controlled (not illustrated).

Figure 3:
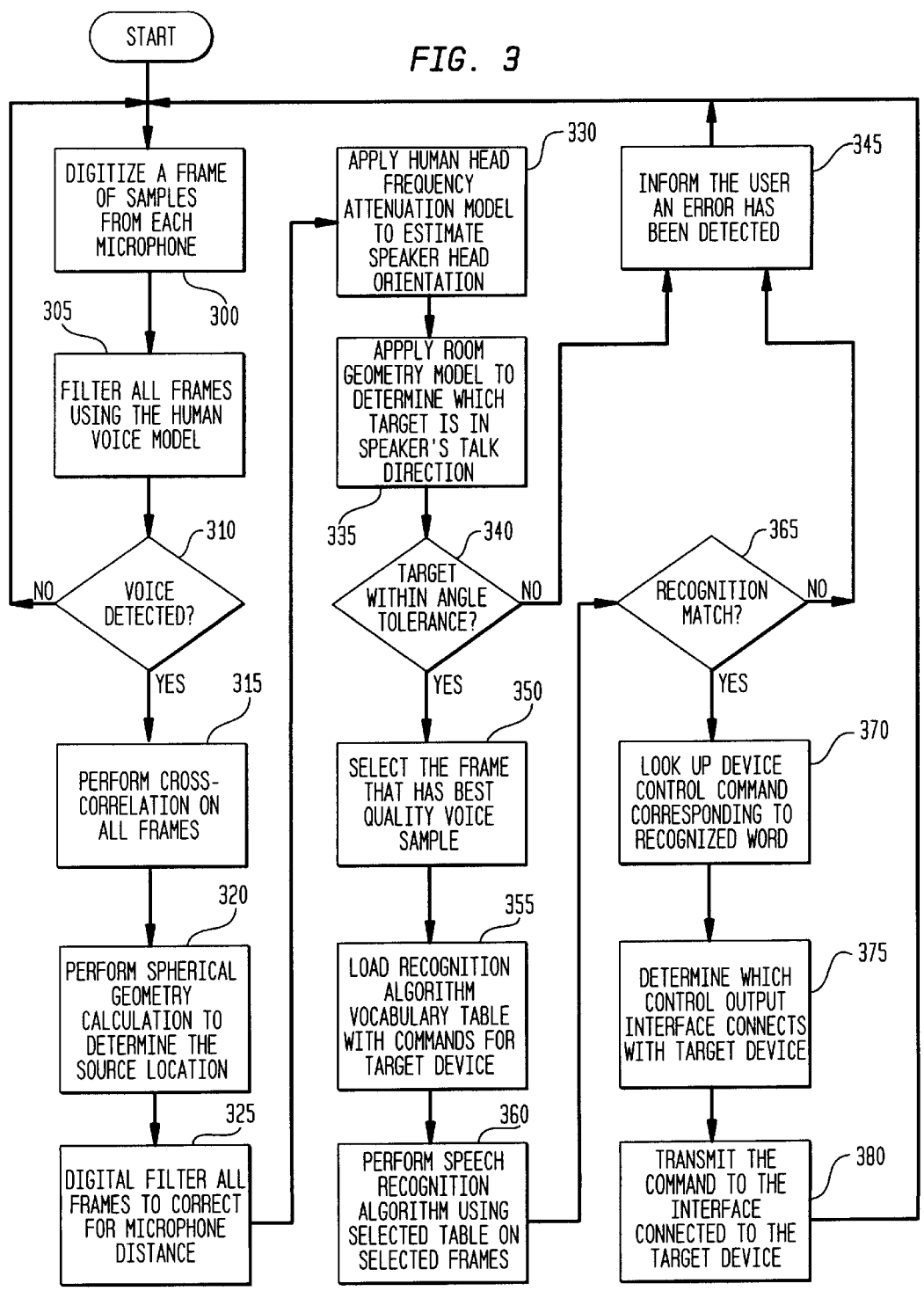
FIG. 3 is a program flow chart of the directional ASR controller in accordance with the present invention.

FIG. 3 is a program flow chart of the directional ASR controller 50 of the present invention. The system starts useful operation at step 300, where a frame of digitized samples are accepted from each microphone (e.g., from the output of each of the analog to digital converters 220, 225 of FIG. 2). Then in step 305, the frames of digitized samples are filtered using a model of the human voice to isolate those frequencies of most interest, and to attenuate frequencies that lie outside of the human voice range. In step 310 a determination is made, based on the filtered digitized samples, whether the system has detected a human voice. If not, the system resumes operation at step 300.

Figure 7:
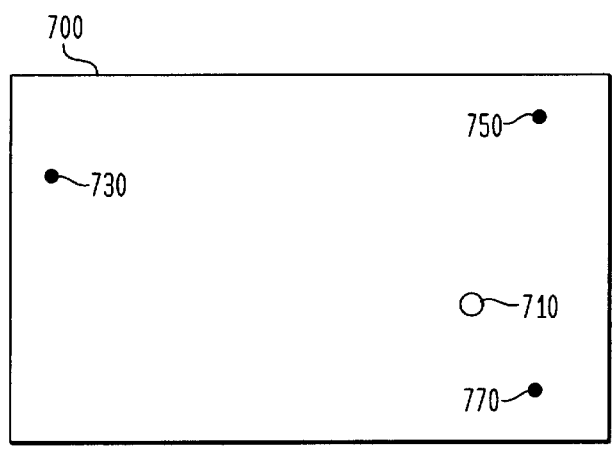
FIG. 7 is a schematic top view of a room illustrating the beginning process of triangulation in accordance with the present invention.
Figure 8:
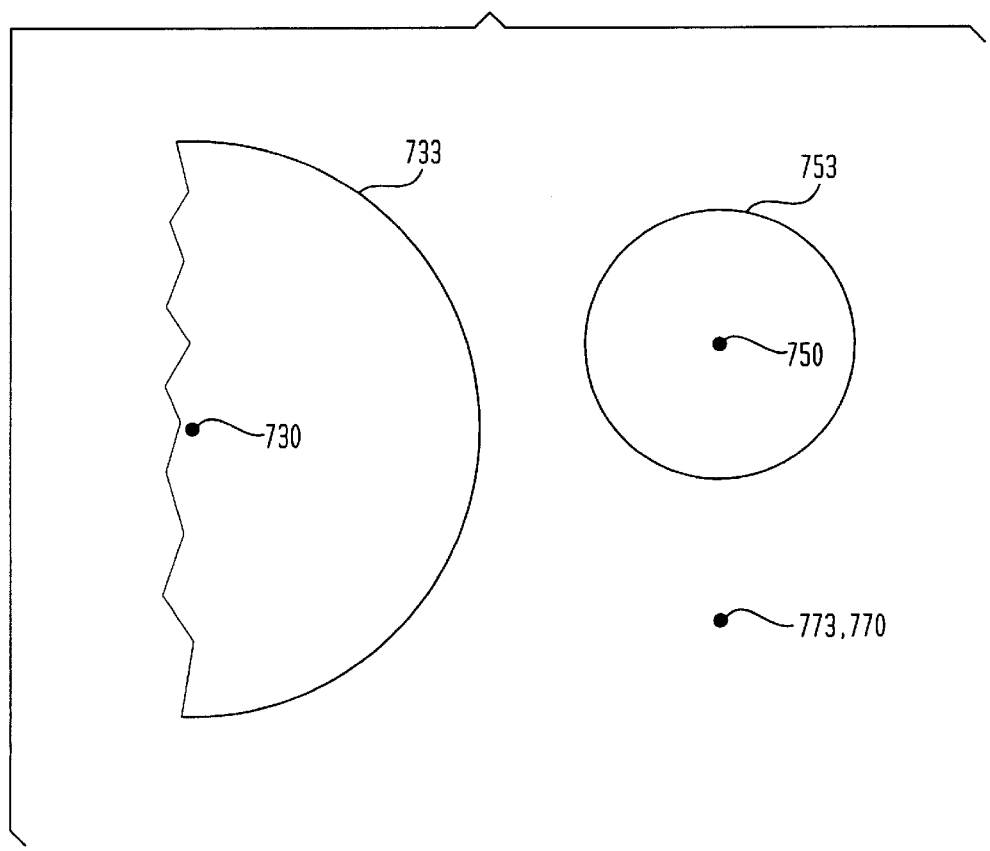
FIG. 8 is another schematic top view of a room illustrating the process of triangulation in accordance with the present invention.
Figure 9:
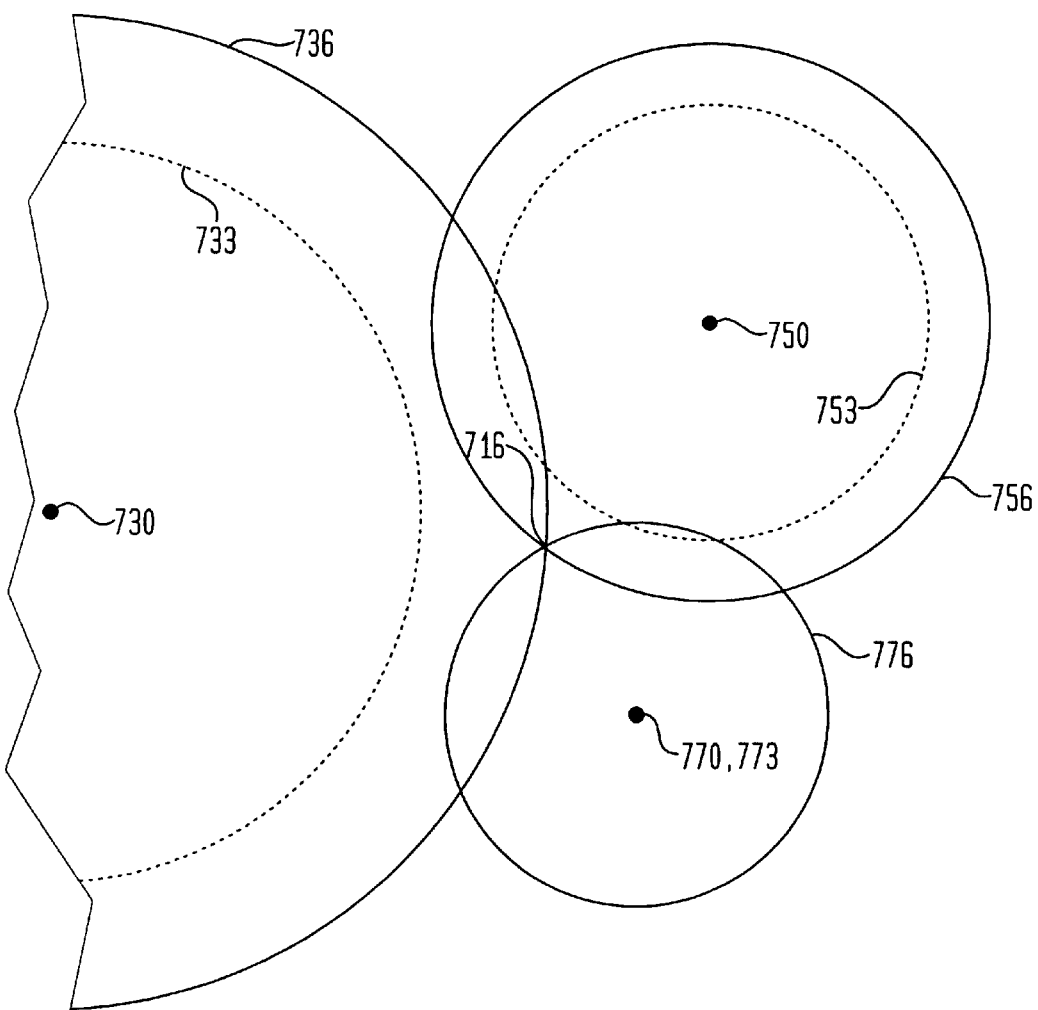
FIG. 9 is another schematic top view of a room illustrating the completion of the process of triangulation in accordance with the present invention.

If a human voice was detected in step 310, the next step 315 is to perform a cross correlation operation on all frames of digitized samples received originally from each of the microphones. The cross correlation operation determines which of the signals from the microphones was the first to arrive at a microphone, and provides a relative timing reference between that first arriving signal and all the others. FIGS. 7–9 and associated description, below, provide more detail on this step.

Processing continues at step 320, where a spherical geometry calculation is made as described above to determine the location of the source of the human voice that was detected. FIGS. 7–9 and associated description, below, provide more detail on this step. Once the location of the source is determined, the next step 325 is to use that location information to apply a correction to all the frames of digitized samples to correct for the known distance from the human speaker to the microphones.

Processing continues at step 330, where a model of the attenuation of the human voice with varying head orientation is applied to the frames of corrected digitized samples to estimate the orientation of the human speaker's head.

Figure 4:
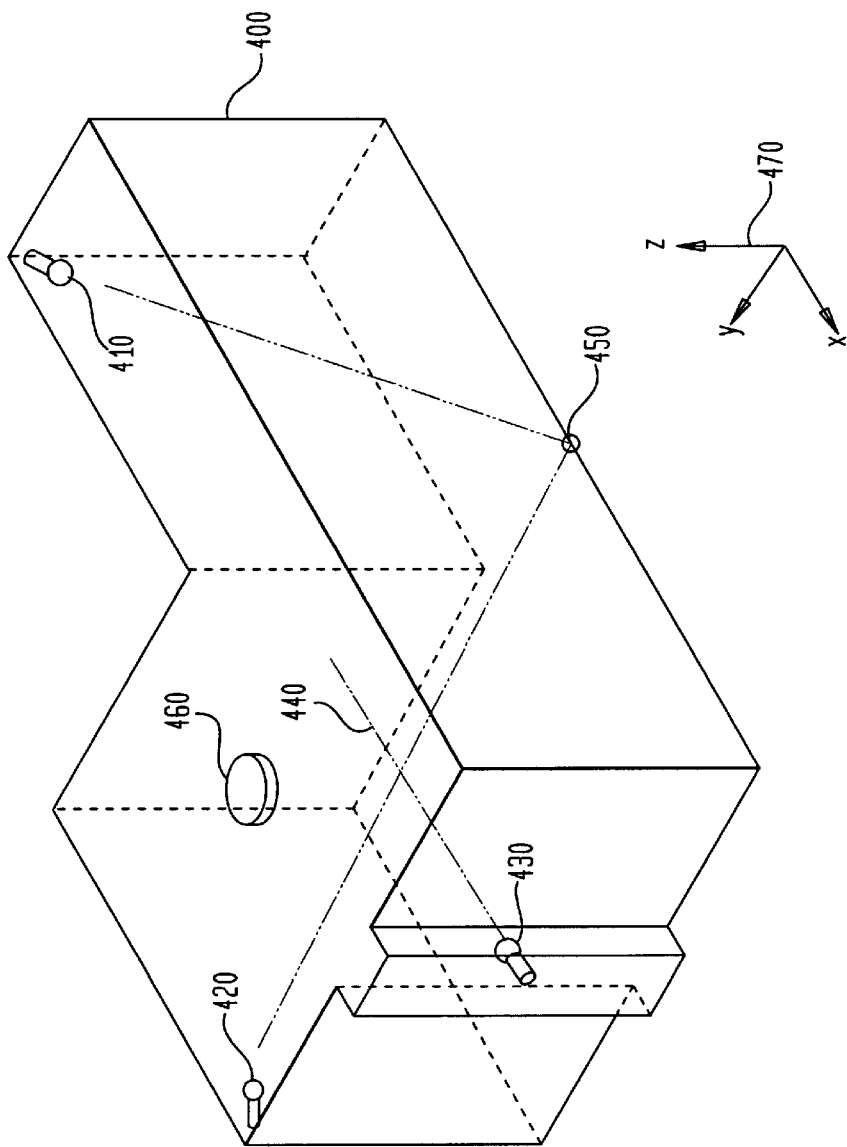
FIG. 4 is a isometric view of one aspect of the present invention as implemented in an irregularly shaped room.
Figure 5:
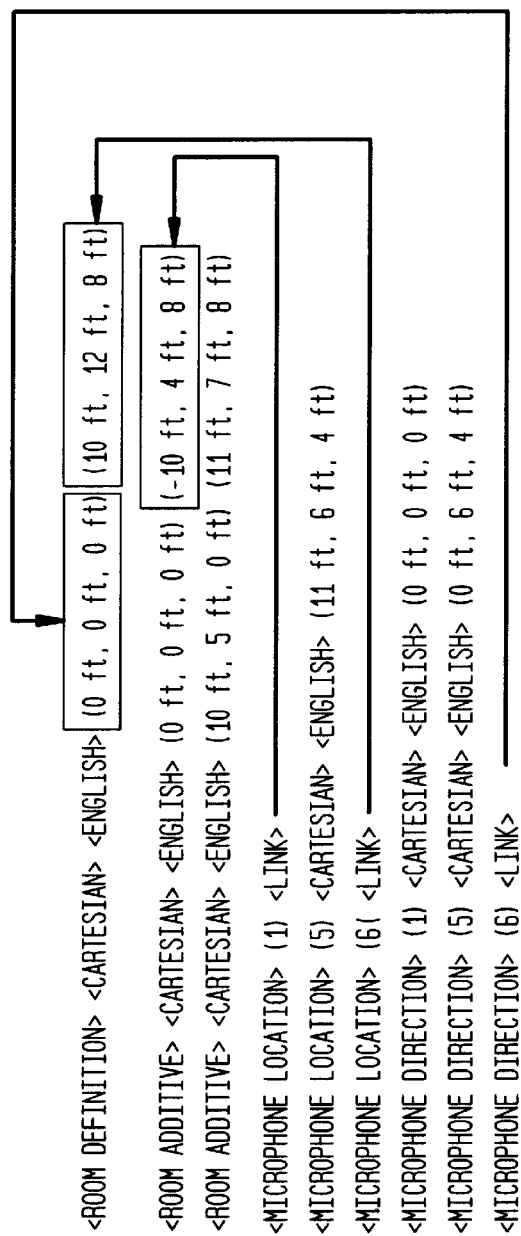
FIG. 5 is a memory map state-flow diagram of a portion of a database as utilized in accordance with the present invention.
Figure 5:
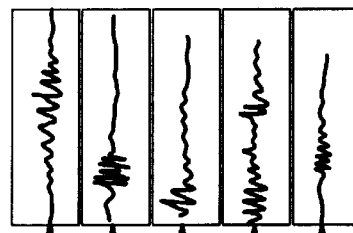

Processing continues at step 335, where a model of the room, whose parameters are stored in a database, is used to determine which ones of the possible targets of a user voice command might be indicated by the known location and orientation of the human speaker's head. In accordance with the present invention, possible targets of a user voice command are merely virtual locations in space, where these locations may or may not be co-located with a controlled ASR device. FIGS. 4–5 and associated description, below, provide more detail on the database.

At step 340 a test is made to see if the known location and orientation of the human speaker's a head clearly identifies a possible target of a voice command within some specified angular tolerance. If the angular error between the known location and orientation of the human speaker's head and the closest possible target of a voice command is too large, the system proceeds to step 345 where the system provides feedback to the user that an error has been detected. This feedback may be an audible beep, razz, or other sound, or it may be a display or some kind. After the feedback step, operation resumes at step 300.

If the angular error between the known location and orientation of the human speaker's head and the closest possible target of a voice command is sufficiently small in step 340, the system has successfully detected which device the user is directing a voice command to, and operation continues with step 350.

In step 350, the frames of digitized samples that have the best quality voice samples are selected. These frames may or may not be from the closest microphone to the user's known location. Operation continues in step 355, where a table consisting of all the possible commands for the successfully detected device are loaded into a speech recognition vocabulary table.

Once the table is loaded, at step 360 the system performs speech recognition on the best quality digitized samples using the loaded vocabulary table. At step 365 a test is made to determine if the speech recognition algorithm has made a match. If the test at step 365 indicates no match was made, operation continues at step 345 by alerting to the user that an error has been detected. This feedback may be an audible beep, razz, or other sound, or it may be a display or some kind. After the feedback step, operation resumes at step 300.

If the test at step 365 indicates a valid match was made, operation continues at step 370 by determining the control command for the successfully detected device responsive to the valid match. At step 375 the interface that connects to the successfully detected device is determined. At step 380, the control command for the successfully detected device responsive to the valid match is transmitted over the interface that connects to the successfully detected device, thereby effecting user voice control of that device. After controlling said device, the system returns to step 300.

As introduced above, the system of the present invention maintains a database which is used to catalog and lookup the locations of the microphones and the locations of the ASR targets. The ASR devices or systems themselves need not be located within the audible range of the user; only the targets to which the user directs a voice command need be in audible range of that user. In accordance with the present invention, the targets are merely virtual locations in space, that may or may not be co-located with a controlled device. For example, the ASR system that controls the lights in a house might actually be located in an equipment closet in the basement of the house. The user would direct a voice command to extinguish the light in a given room (i.e., the room in which the user is present, which may be different than the equipment closet) to the light switch within that same room, and the system of the present invention would then permit the associated respective ASR system to accomplish the requested control.

In a preferred embodiment, there are multiple classes of entries within the database. Examples of possible classes include, but are not limited to, geometric descriptions of the room, geometric descriptions of the microphone locations, geometric descriptions of the microphone orientations, target locations, and target vocabularies.

The class of geometric descriptions of the room may be provided for the database in a variety of formats. One preferred format locates a room by specifying two diagonally opposite points in corners of the room, thereby defining the volume of a rectangular orthogonal 3D prism. Note that room defined by a rectangular orthogonal 3D prism has 8 corners. In another format, two sets of coordinate points may specify the center of the room and a corner of the room, respectively, thereby defining the volume of a rectangular orthogonal 3D prism. In yet another format, each of the corners of the room may be specified as a point independently, thus easily permitting a non-rectangular prism volume to be specified.

In each geometric format, the specification of each point may be comprised of Cartesian coordinates (e.g., x, y, z values), polar coordinates (e.g., $\phi$, r, z values), and spherical coordinates (e.g., $\phi$, r, $\alpha$ values). A user-defined scale may be used instead of the more traditional English and SI units. For example, a room may be described in Cartesian corner coordinates as (0 ft, 0 ft, 0 ft), (10 ft, 12 ft, 8 ft). The same room could be described as Cartesian center/corner coordinates as (0 ft, 0 ft, 0 ft), (5 ft, 6 ft, 4 ft).

The geometric description of the room may be further described by any collection of volumes as described above. For example, the database may include a first volume of a rectangular orthogonal 3D prism and a second volume of a rectangular orthogonal 3D prism, wherein the first volume and the second volume touch or intersect. Any number of additional volumes may be used to further refine the geometric description of the volume of the room, wherein the room volume is determined to be the intersection or merging of all the specified volumes.

This merging function of 3D volumes permits the system to accommodate the variety of room shapes present in real-world applications. For example, the irregularly shaped room 400 of FIG. 4 could be described as the merge of a first main volume (0 ft, 0 ft 0 ft), (10 ft, 12 ft 8 ft) and a second hallway volume (0 ft, 0 ft 0 ft), (−10 ft, 4 ft, 8 ft), and a third cul-de-sac volume (10 ft, 5 ft, 0 ft), (11 ft, 7 ft, 8 ft), as long as all three volumes are referenced with respect to a common origin 450 and a common set of coordinate axes 470.

The class of geometric descriptions of the microphone locations may be provided to the database in a variety of formats similar to those for the geometric descriptions of the room, as above. Microphone locations may be specified in Cartesian coordinates, polar coordinates, and spherical coordinates. Alternatively, microphone locations may be specified as links to any specified geometric location of a corner of the room. For example, microphone locations 410 and 420 of FIG. 4 are linked to corners as specified in the database for the room. Database entries for microphone locations further comprise a microphone identifier to distinguish between location entries for the plurality of microphones in the present invention. For example, a microphone location 430 centered in the cul-de-sac wall of FIG. 4 could be specified as (#5, 11 ft, 6 ft, 4 ft).

The class of geometric descriptions of the microphone orientations may be provided to the database in a variety of formats similar to those for the geometric descriptions of the room, as above. Microphone orientations may be specified as any point along the directional axis of the microphone; this point plus the location of the microphone uniquely determine its position and orientation. Alternatively, the orientation of the microphone can be specified in Cartesian coordinates, polar coordinates, or spherical coordinates relative to the microphone location, or relative to another feature of the room (e.g., a corner, or the origin of the coordinate system). The origin of the room 450 is implicitly determined by the coordinates used to identify any other features in the room. Database entries for microphone orientations further comprise a microphone identifier to distinguish between orientation entries for the plurality of microphones in the present invention. For example, a microphone axis 440 orientation for the microphone 410 centered in the cul-de-sac of FIG. 4 could be specified as (#5, 0 ft, 6 ft, 4 ft).

Geometric descriptions of the target locations may be provided in a variety of formats similar to those for the geometric descriptions of the microphone locations, as above. Database entries for target locations further comprise a target identifier to distinguish between location entries for the plurality of targets in the present invention. Database entries for target locations may further comprise an angular tolerance to be associated with each target location. For example, the light fixture 460 centered in the ceiling of the main room in the above examples could have its target location specified in the database as (#7, 5 ft, 6 ft, 7.5 ft).

The database entries for the class of target vocabularies of the present invention may include a word number, a word template pointer, an output port for an action, and an output message. The word number indexes the words within the database with respect to a given target The word template pointer is a pointer to a recognition template structure as known in ASR systems. The output port for an action is the channel in which the system produces an output, conditionally predicated on a match to the present target word number and a match on the word template structure. The output messages is the data sent via the respective output port. For example, the database entries for the light fixture number 7 of the previous examples can each include the target number (7) of the light fixture; an output port corresponding to an X.10 home controller interface; one word template each for "off", "dark", "dim", "brighten", and "on"; and five corresponding output messages, respectively corresponding to the home controller interface commands issued (e.g., "zero", "zero", "down", "up", and "one").

FIG. 5 illustrates a portion of one embodiment of the database containing a variety of classes of entries. Links and pointers are shown to illustrate that redundant information need not be stored in the database. The portion of the database shown in FIG. 5 roughly corresponds to the examples given above for FIG. 4. In a preferred embodiment, the present invention would have at least two ASR targets for user voice commands, and would have at least four microphones for the room illustrated in FIG. 4; the database in it's entirety would include entries for all ASR targets and microphone locations.

In a preferred embodiment, the database is maintained by a subsystem comprising a general purpose central processing unit (CPU), input/output (I/O) links coupled to the controller, volatile random access memory (RAM), and non-volatile storage (e.g., battery-backed RAM, other semi-conductor storage, disk, tape, optical storage). The database is responsive to the system for looking up and providing location coordinates for each microphone and for each target location associated with an ASR system on demand from the controller. The algorithms for performing database lookup, indexing, linking, and other routine database maintenance on a general purpose CPU are well within the knowledge of one skilled in the art of computer-based databases. The database of the preferred embodiment is also responsive to entry of location coordinates, in the manners detailed above, or in response to a learning mode of the controller as detailed below.

In a preferred embodiment, the system of the present invention provides for an operating mode and a learning mode. The learning mode permits the system to learn the locations of the microphones and/or the locations of the targets of voice commands. The learning is facilitated by the user moving about the room and making a predefined sound at selected locations. The sound may be from a clicker, a whistle, a device with a frequency-sweep chirp, the user saying a predefined word, or other sound. In learning mode, the system compiles data associated with the user sounds and, with sufficient samples to eliminate ambiguous or symmetrical results, can thereby determine the relative locations of the microphones with respect to each other, and the relative locations of the targets for voice commands with respect to the microphones. The learning mode may be completely automatic, or it may require the user to supply limited information about the placement—for example, which of the microphones are located in a corner of the room.

The learning mode of the present invention can also be used to fine-tune the information in the database entered via other means. If the user has previously entered location coordinates of the microphones, the learning mode may adjust those locations in the database based on the empirical data gathered from detecting the user sounds. The learning mode can also automatically be invoked if the system detects the fact that one or more of the microphones may have been moved since the database was last updated.

A preferred embodiment also permits a manual mode for adding to and updating any or all entries within the database, where the database information may be entered or edited by a user using a text editor program or a graphical user interface program. The program used by the user may be resident and operable within the system of the present invention, or it may be resident and operable within a separate user-supplied computer system that interfaces to the system of the present invention. For example, in one embodiment, the present invention includes a serial interface that permits coupling the system to a conventional low cost personal computer for database updating. In other embodiments, the coupling may be via a computer local area network (LAN), a parallel port, a universal serial bus (USB), IEEE 1394 interface, an infrared data link, or other small computer connection standard.

Figure 6:
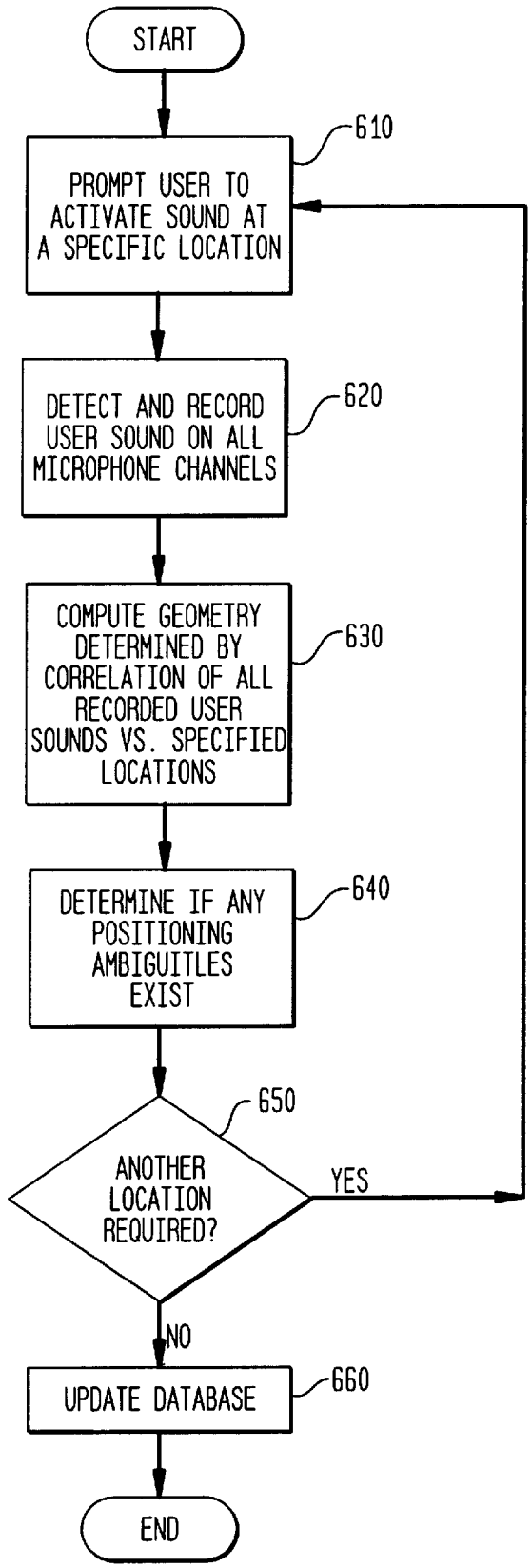
FIG. 6 is a program flowchart for the automatic learning mode in accordance with the present invention.

FIG. 6 is a flowchart illustrating the program flow for automatically learning the location of the microphones and ASR targets within a room. To engage learning mode, the user activates a switch or control on the system (or sends the appropriate learning mode command via a coupling with a personal computer). The first step 610 is for the system to prompt the user to activate a sounding device at a specific location. The sounding device may be any device similar to those listed above.

The specific location is typically selected from a list of standard locations known by the system, but may also include other locations whose position can be clearly communicated to the user. In a preferred embodiment, the list of standard locations known by the system comprises the center of the room, each of the corners of the room, the centers of each wall of the room, and the location of each ASR target. Other locations may include locations of windows, doors, major pieces of furniture, the floor in the center of the room, and various elevations corresponding to the user standing, sitting, and lying down.

In step 620 the sound produced by the user is detected by the plurality of microphones and the information from same are recorded by the system. This information includes the time of arrival of each signal, signal strength, and frequency profile.

In step 630 the system uses the recorded information corresponding to each location so far thus entered, to compute the positioning of each of the microphones within the volume of the room, and the geometry of the room itself.

Generally, the accuracy with which the system can compute the positions increases with additional recorded samples. It is also the case that until sufficient samples have been recorded and considered, the locations of the microphones and targets may be under-specified and therefore ambiguous. Step 640 determines if the number of sound samples from various known locations are sufficient to accurately establish the position of the microphones and targets.

Decision 650 branches back to step 610 to prompt the user to activate a sound at another specific location if the number of sound samples from various known locations are insufficient to accurately establish the position of the microphones and targets. Alternatively, if the system has sufficient information, then decision 650 branches to step 660 wherein the database is updated with the geometry computed from the detected signals.

Sound takes a different amount of time to travel from the user to each of the microphones arrayed in the room. Each of the microphones receives corresponding signals, where the signal strength or amplitude, phases, arrival times, and frequencies are subject to the user's position and orientation within the room (the time the electrical signals take to get from the microphones to the signal processor is negligible).

The speech model utilized in the ASR controller of the present invention knows the difference between human speech and noise. That model is continuously active on some or all channels, and when the model determines that the user said something that is sufficiently above a threshold to be deemed a possible speech command, the system starts to determine the user's location.

A mathematical algorithm referred to as cross correlation is used to determine the exact arrival time of each sound on each charnel which results in a delay number for each channel, relative to the microphone channel that first received the signal. This delay number is thus related to the detected delay from the user to the microphone in question, and the microphone having the smallest delay number is initially presumed to be the closest microphone to the user. Cross correlation algorithms are discussed on page 61 in S. Haykin, *Communication Systems*, John Wiley, 1978, ISBN 0-471-02977-7 (out of print); see also S. Haykin, *Communication Systems,* 3rd Ed., John Wiley, 1994, ISBN 0-471-57176-8; and Paul Danzer (Editor).

The system then uses 3D triangulation techniques as generally known in the art to compare the arrival times and phases of the signals from each of the microphones, thereby deriving the user's approximate position in the room. Triangulation is discussed in 1999 *The ARRL Handbook for Radio Amateurs,* 76th Ed., American Radio Relay League, November 1998, ISBN 0872-59181-6. Triangulation is performed in the present invention by an algorithm that uses the delay number to compute a spherical boundary relative to the respective microphone on which the user must be present The set of all spherical boundaries are then arranged in relation to one another using the location of the microphones, as stored in the database, as centers of the spheres. The user's position is then determined by triangulation to be at the point of intersection of all the sets of spherical boundaries.

FIGS. 7–9 show three stages of a 2D representation of the triangulation techniques as applied in accordance with the present invention. Although for simplicity shown in two dimensions, the procedure applies equally to locating objects within three dimensions.

The user 710 and microphones 730, 750, and 770 are located within room volume 700 of FIG. 7. When the user issues a voice command, a sound pressure wave travels from the user out in all directions at equal speed.

Given the position of the user as shown in FIG. 7, the sound pressure wave will impinge upon the closest microphone 770 first, followed slightly thereafter by the wave arriving at microphone 750, and then later the wave will arrive at microphone 730. The system detects the event of the first arrival of the sound pressure wave at microphone 770. It then stores the detected sound pressure wave, and detects the time interval between first detecting at microphone 770 and the next detection, namely that of microphone 750. It is also able to detect the time interval between detecting the sound pressure wave at microphone 770 and the third detection, namely that of microphone 730. As each microphone 730, 750, 770 detects the sound pressure wave, a digitized signal recording of the sound pressure wave detected by that respective microphone is recorded and stored for further analysis by processing algorithms.

Based on the first detection at microphone 770 and the time intervals detected for microphones 750 and 730, the system arrives at a first approximation for position, wherein an assumption is made that the user is located at the microphone that first detected the sound pressure wave. The system then checks the detected time intervals to determine if the assumption can be valid, based on the amount of time it takes a sound pressure wave to travel throughout the room. This is shown in FIG. 8, which tentatively places the perceived location of the user coincident with microphone 770. The system then computes the spherical boundary (in the illustrated example, shown in section as a circle) on which the user must be present for each of the microphones 730,750. The radius of the sphere (circle) is determined by the time interval duration and the speed of sound in air. This results in a mathematical event horizon sphere (circle) computed for each microphone, where the radius of the computed event horizon 773 for the closest microphone 770 is trivially zero. The event horizon 733 is computed for microphone 730, and the event horizon 753 is computed for microphone 750. The system then checks to see if the computed event horizons encompass a location in common.

As shown in the example illustrated in FIG. 8, the initial computed event horizons 733, 753, and 773 do not encompass any location in common. As a result, the system invalidates the assumption that the user is located at the microphone that first detected the sound pressure wave, and expands the computed event horizons uniformly until they meet as shown in FIG. 9.

In FIG. 9, the expanded event horizon 736 corresponds to the expansion of event horizon 733 of microphone 730, the expanded event horizon 756 corresponds to the expansion of event horizon 753 of microphone 750, and the expanded event horizon 776 corresponds to the expansion of event horizon 773 of microphone 770. As shown in FIG. 9, the expanded event horizons thus computed encompass the single location 716, which corresponds to the location of the user (not shown).

The process of triangulation generally minimally requires one more microphone location than the number of dimensions in consideration, and there may be some constraints on their location. For the 2D process as illustrated in FIGS. 7–9, three microphones are minimally required, and the microphone locations may not be co-linear. A co-linear arrangement of microphone locations is an arrangement that places the microphone locations all along any single geometric straight line. If one can project an imaginary straight line of any length that passes simultaneously through each and every one of the microphone locations, those locations are considered co-linear.

For the general 3D case as used by the preferred embodiment of the present invention, four microphones are minimally required, and the locations of the microphones may not be co-planar. A co-planar arrangement of microphone locations is an arrangement that places the microphone locations all within any single geometric plane. If one can project an imaginary geometric plane of any area that passes simultaneously through each and every one of the microphone locations, those locations are considered co-planar.

The inclusion of additional microphones beyond the minimum required will not impair the system's ability to triangulate the position of the user.

In a special case for an alternate embodiment, where each and every desired ASR target is located within a target plane, and each and every microphone of the system is located within a microphone plane that is parallel to the target plane, then three microphones are the minimum required for proper functioning of the invention.

Other examples of 3D triangulation to determine position as known in the art include the Global Positioning Satellite (GPS) system, radio direction finders as used for aircraft and marine navigation, and sonic digitizers used to input the surface shape of an object into a computer system which are available from various computer retailers and are sometimes used as a 3D mouse.

Besides the information about location contained in the absolute delays to each microphone, there is also information about the head orientation contained in the amplitude and frequency content of the signals. As known in television audio system design, an important rule is to always place a microphone near the camera, and never at the back of a set. If this rule is broken, the television viewers easily perceive the quality of sound pickup is different than the camera's view, and becomes a distraction as voices become more muffled as actors face the camera, and clearer when they face the back wall of the set. It is therefore apparent that the user's mouth projects most efficiently in the direction the user is facing, resulting in a relatively higher amplitude received by the microphones in line with the direction of the user's voice. Also, the absorption of the users head and any hair contribute to a reduction of the high frequency content of all signals other then those to microphones the user is directly facing.

Georg Neumann GmbH, an affiliate of Sennheiser, Berlin, Germany, produces and sells a commercial product known generically as a binaural head, as model number KU 100. The KU 100 product is carried in the U.S. by Neumann U.S.A of Old Lyme, Conn. It is basically a mannequin head with a microphone in each ear. If used to record a live presentation event like a concert, it is asserted that the shape of the outside surface of the KU 100 leads to very accurate stereo imaging, and is especially effective if the user listens to the recorded stereo playback via headphones. Additional information about the KU 100 product was available at the time of application at URL http://www.neumann.com/.

The shape of the head influences the perception of sound at the ear (perception depends upon amplitude, frequency, directionality, and phase), as demonstrated by the success of the KU 100 binaural head apparatus of Neumann. Given this influence, it follows that the shape of the head will also influence the amplitude, phase, frequency response, and directionality of the sounds from the speaker's mouth, as perceived by simple microphones located at different angles from the head.

Signal processing using models similar to the binaural head microphone can therefore be used to estimate the orientation of the speaker's head. The degree of the high frequency attenuation is roughly related to the degree the microphone in question is off-axis with respect to the user's mouth. The most attenuation will be found on microphones directly behind the user.

It is important to use the location information, as determined by triangulation or other means, in the computation of the head position. This is because a user may be closer to a microphone on one side of a room, but be speaking towards a different side of the same room. The microphones behind the user are clearly closer and are likely to receive a higher amplitude signal. Without using the user's location or position information, the system could erroneously determine the user's orientation based on the uncorrected higher amplitude signal of the closer microphone.

By providing further processing of the amplitude, phase, and frequency profile of the signals, the system of the present invention determines which microphones were in the most direct line with the user's mouth, and therefore determines the approximate orientation of the user's head when the command was issued. The first step is to analyze the signals from the microphones to determine amplitude and frequency data for each microphone. In the present invention, these amplitudes and frequencies are then modified or adjusted using room audio propagation models to compensate for the location of the user within the room with respect to the microphones. The adjustment normalizes all the input signals with respect to the user's position to eliminate the possibility of erroneously determining the user's orientation. The high frequency content of the adjusted signals are then compared to identify which of the microphone channels has the smallest amount of high frequency attenuation. The corresponding microphone is thus identified as the microphone that the user is facing.

The present invention provides a single controller that manages an entire room full of ASR devices. This controller can either generate control messages to each device over a non-speech path. Examples of non-speech paths include a local area network (LAN), infrared (IR) remote, and consumer electronics control interfaces such as CEBus or X10. If there is a device that would be programmed to respond to the received command in approximate alignment with the direction the user was facing, in one embodiment the directional ASR system could issue the appropriate command to the appropriate device over the non-speech path, and the single device would respond.

In another embodiment, the controller has low-level audio outputs that can be plugged to each device's ASR microphone input. The controller only directs an audio signal to the individual device it thinks the user was facing when he spoke the command. The system could issue the actual voice command to the ASR device for further independent ASR processing by that device.

In yet another embodiment, each of the ASR systems performs independent processing, but is inhibited from activating on a recognized command until the appropriate enable signal is generated by the present invention and relayed to the appropriate ASR system, thus only the device that is in alignment with the direction the user was facing would be permitted to respond to the voice command.

Each controlled device has a target location in the room for its command input. If the user's head is pointing at the target location of the device to be controlled (within a specified angular tolerance), the speech recognition algorithms associated with all other devices in the room are disabled. It is important to note that if an ASR device has its own microphone, and its own ASR is always active, and it has no input to enable or inhibit the processing of voice commands, the present invention cannot improve its performance.

Advantageously, the directional ASR system of the present invention would reduce the number of false command executions caused by the user saying command keywords in normal speech, because voice commands would only execute to completion if the user were facing a particular device to within a small, programmable angle tolerance. For example, the user typically would not be directly facing the room's light switch when talking on the phone, therefore saying the word "off" during a phone conversation would not cause the lights in the room to be extinguished.

In the prior art, many ASR systems ask for confirmation before executing a critical command. Another prior art solution is to have special commands to wake up a system and put it to sleep, where voice commands can only be activated when the system is awake. One example is a surgical robot that assists in laproscopic surgery, which requires an operator to speak the name of the robot immediately prior to issuing a command. These prior art solutions can also be applied to the multiple ASR systems controlled by the present invention. The directional dimension of the present invention solves the problem of multiple devices to be controlled in an elegant and novel fashion.

Also advantageously, the system of the present invention can greatly improve the performance and accuracy of voice control. Presently, ASR systems and algorithms match voice input signals against a recognition vocabulary. The amount of time an ASR system takes to decode a speech command is directly proportional to the number of words in the vocabulary of the recognizer. To control N devices, ASR algorithms in prior art systems have to process the much larger vocabulary set that represented the union of all the vocabularies of all the individual controlled devices. Although this requires more resources, it is still within the scope of the present invention.

The present invention uses directional clues (e.g., the user's position and orientation) to determine which of N devices the user is talking to. As a result of using the directional clues, the size of the recognition vocabulary or dictionary the system must use can be reduced to only the commands needed by the target device (note that all N devices can have a different number of commands). Further, the speed of recognition can be increased, compared to a system based on existing practice that must recognize all commands of all N devices. Since the first step in the process is to determine which device (if any) the user is facing, the specialized vocabulary template for a particular device is the only model the recognition algorithm must match. Smaller vocabularies greatly improve recognition accuracy, and greatly reduce the CPU time required to perform the recognition algorithms, leading to faster response times because the total number of comparisons that must be made sequentially is greatly reduced.

From the foregoing, it will be observed that numerous variations and modifications may be effected without departing from the spirit and scope of the invention. It is to be understood that no limitation with respect to the specific apparatus illustrated herein is intended or should be inferred. It is, of course, intended to cover by the appended claims all such modifications as fall within the scope of the claims.

What is claimed is:

1. A voice activation system for user control of a plurality of automatic speech recognition (ASR) systems, comprising:
   a plurality of ASR systems;
   a plurality of microphones dispersed within a three-dimensional domain within audible range of a user, wherein each one of the plurality of microphones provides a respective audible voice signal responsive to speech from the user; and
   a controller coupled to said plurality of microphones and to each of said plurality of ASR systems for selectively enabling one of said plurality of ASR systems;
   wherein each one of the plurality of ASR systems is responsive to the controller, and
   wherein the controller is responsive to each one of the received respective audible voice signals.

2. The voice activation system as in claim 1, wherein the plurality of microphones are distributed uniformly at regular spacing intervals within the three-dimensional domain.

3. The voice activation system as in claim 1, wherein the plurality of microphones are distributed equidistant from a common reference point within the three-dimensional domain.

4. The voice activation system as in claim 1, wherein the controller further comprises means for providing a database containing at least a respective location within the three-dimensional domain of each one of the plurality of ASR systems.

5. The voice activation system as in claim 1,
   wherein at least one of the plurality of ASR systems has associated with it at least one respective one of the plurality of microphones; and
   wherein at least one of the plurality of microphones associated with a corresponding respective one of the plurality ASR systems is co-located with the corresponding respective ASR system.

6. The voice activation system as in claim 1,
   wherein each one of the plurality of ASR systems further comprises a respective audio input,
   wherein the voice activation system further comprises an audio delay storage means coupled to the controller for selectively storing and delaying an audio signal; and
   wherein the stored and delayed audio signal is selectively coupled by the controller to the audio input of one of the ASR systems.

7. The voice activation system as in claim 1, wherein each one of the ASR systems further comprises a respective enable input coupled to the controller, wherein the respective ASR system is selectively enabled responsive to it's respective enable input.

8. The voice activation system as in claim 1, wherein the controller is operable in at least a learning mode and an operating mode.

9. The voice activation system as in claim 8, wherein the operating mode is continuously active for at least one of the plurality of microphones.

10. The voice activation system as in claim 1, wherein the controller further comprises means for providing a database containing at least a respective location within the three-dimensional domain of each one of a plurality of possible targets of a user voice command.

11. The voice activation system as in claim 10, wherein the database further comprises an angular tolerance for each respective possible target of a user voice command.

12. The voice activation system as in claim 10, wherein the controller further comprises:
    means to determine a position and an orientation of the user responsive to a received audible voice signal from the user; and
    means to match the position and orientation of the user to the respective target in the database.

13. The voice activation system as in claim 12, further comprising:
    means to select a target command subset responsive to the means to match; and
    means to associate a particular command from the target command subset responsive to the audible voice signal.

14. The voice activation system as in claim 12, wherein the means to match further comprises a programmable angular tolerance with respect to the orientation of the user.

15. The voice activation system as in claim 1, wherein the controller further comprises means to determine a position and an orientation of the user responsive to a received audible voice signal from the user.

16. The voice activation system as in claim 15, wherein the controller further comprises at least one of a digital signal processor (DSP) and a signal processing circuit.

17. The voice activation system as in claim 16,
    wherein the controller further comprises a database containing at least a respective location within the three-dimensional domain of each one of the plurality of microphones; and
    wherein the leaning mode is automatically triggered by detection of a set of input signals inconsistent with the location of the microphones in the database.

18. The voice activation system as in claim 1, wherein the controller further comprises means for providing a database containing at least a respective location within the three-dimensional domain of each one of the plurality of microphones.

19. The voice activation system as in claim 18, wherein the means for providing a database further comprises:
    a first graphical user interface interaction means to allow the user to interactively design at least one scale drawing of the three-dimensional domain; and
    a second graphical user interface interaction means to allow the user to interactively locate each one of the plurality of microphones with respect to the scale drawing.

20. The voice activation system as in claim 18, further comprising:
    triangulation means to detect a position and an orientation of the user within the three-dimensional domain, responsive to the plurality of audible voice signals;
    checking means to determine if the detected position and orientation is inconsistent with the location within the three-dimensional domain of each one of the plurality of microphones in the database;
    database selection means to determine the largest set of the plurality of microphone locations in the database that are consistent with the determination of the position and the orientation of the user within the three-dimensional domain; and database modification means to modify the database to change the stored location within the three-dimensional domain of each one of the plurality of microphones not in the largest set, to be consistent with the determination of the position and the orientation of the user within the three-dimensional domain.

21. The voice activation system as in claim 18, further comprising:

timing means to determine an exact arrival time for each respective one of the plurality of audible voice signals;

cross correlation means to calculate a delay number for each respective one of the plurality of audible voice signals by cross correlating the exact arrival times for all of the plurality of audible voice signals;

boundary means to compute a spherical boundary on which the user's location must be present, relative to the location of each respective one of the plurality of microphones as stored in the data base, responsive to the respective delay number for each respective one of the audible voice signals;

intersection means to compute the intersection of all the computed spherical boundaries, wherein said intersection defines the detected position of the user within the three-dimensional domain; and wherein the controller is further responsive to the intersection means.

22. The voice activation system as in claim 21, further comprising:

amplitude and frequency analysis means to analyze the plurality of audible voice signals producing respective amplitude data and respective frequency data for each of the plurality of audible voice signals;

amplitude and frequency adjustment means to adjust the respective amplitude data and the respective frequency data for each of the plurality of audible voice signals responsive to the intersection means;

amplitude and frequency measurement means to measure the adjusted respective amplitude data and the adjusted respective frequency data for each of the plurality of audible voice signals, producing a measure of the attenuation of high frequency content for each respective audible voice signal;

frequency attenuation comparison means to compare all the measures of attenuation of high frequency content for all respective audible voice signals, to determine the audible voice signals having a smallest measure of high frequency attenuation;

database lookup means to determine the microphone location corresponding to the audible voice signal having the smallest measure of high frequency attenuation as determined by the frequency attenuation comparison means;

user direction determination means to determine the direction the user is facing, responsive to the database lookup means and the intersection means; and wherein the controller is further responsive to the user direction determination means.

23. The voice activation system as in claim 1, wherein the plurality of microphones are arranged in a predefined pattern within the three-dimensional domain.

24. The voice activation system as in claim 23, wherein the predefined pattern comprises at least one microphone located at each location that may be a target of an audible voice signal from the user.

25. The voice activation system as in claim 23, wherein the predefined pattern comprises at least one microphone located at each corner of the three-dimensional domain.

26. The voice activation system as in claim 23, wherein the predefined pattern comprises at least one microphone located at the center of each wall in the three-dimensional domain.

27. The voice activation system as in claim 23, wherein a set of significant architectural features are defined to include at least one of doors, windows, large furniture, internal obstructions, and partitions; and wherein the predefined pattern comprises at least one microphone located in a relation to each of the set of significant architectural features.

28. The voice activation system as in claim 23, wherein all of the microphones in the plurality of microphones have a unidirectional pattern.

29. The voice activation system as in claim 28, wherein all of the microphones in the plurality of microphones have a same frequency response, a same dynamic range, and a same sensitivity.

30. A method for simultaneously controlling a plurality of automatic speech recognition (ASR) systems, the method comprising the steps:

accepting a plurality of voice input signals from a respective plurality of microphones located in a three-dimensional domain within audible range of a user;

determining a position and an orientation of the user within the three-dimensional domain responsive to the plurality of voice input signals;

selecting one of the plurality of ASR systems responsive to the determining of the user's position and orientation;

enabling the selected ASR system for voice command operation; and disabling a set of ASR systems wherein the set comprises the plurality of ASR systems excluding the selected ASR system.

31. The method as in claim 30, further comprising the step of arranging the plurality of microphones in a predefined pattern within the three-dimensional domain.

32. The method as in claim 30, further comprising the step of maintaining a database, the database containing at least the location within the three-dimensional domain of each of the ASR systems.

33. The method as in claim 30, further comprising the step of associating at least one of the ASR systems with at least one corresponding one of the plurality of microphones.

34. The method as in claim 30, wherein the step of determining the position and the orientation of the user further comprises the method of storing samples of at least one voice input signal during the determining; and wherein the step of enabling the selected ASR system further comprises relaying the stored samples of the voice input signal to the selected ASR system.

35. The method as in claim 30, wherein the step of selecting one of the plurality of ASR systems responsive to the determining of the user's position and orientation further comprises:

choosing the ASR system most likely desired by the user for voice command operation responsive to a programmable angular tolerance for determination of the user's orientation.

36. The method as in claim 30, further comprising the step of maintaining a database, the database containing at least a location within the three-dimensional domain of each possible target of a user voice command.

37. The method as in claim 36, wherein the step of maintaining the database further comprises the method of:
   interactively designing a scale drawing of the three-dimensional domain; and
   locating each possible target of a user voice command with respect to the scale drawing.

38. The method as in claim 37, wherein the step of maintaining a database further comprises the method:
   establishing each of the plurality of microphones at a respective unique user controlled location within the three-dimensional domain;
   sounding a user test sound at each of a plurality of possible targets of a user voice command within the three-dimensional domain producing system training data; and
   creating an initial database containing location information for each of the plurality of microphones, and location information for each of the plurality of possible targets of a user voice command, responsive to the system training data.

39. The method as in claim 30, further comprising the step of maintaining a database, the database containing at least the respective location within the three-dimensional domain of each one of the plurality of microphones.

40. The method as in claim 39, wherein the step of maintaining the database further comprises the method of:
   interactively designing at least one scale drawing of the three-dimensional domain; and
   locating each one of the plurality of microphones with respect to the scale drawing.

41. The method as in claim 39, wherein the step of maintaining the database further comprises the method of:
   detecting a position and an orientation of the user within the three-dimensional domain responsive to the plurality of voice input signals inconsistent with the location within the three-dimensional domain of each one of the plurality of microphones in the database;
   determining the largest set of the plurality of microphone locations in the database that are consistent with the determination of the position and the orientation of the user within the three-dimensional domain; and
   modifying the database to change the stored location within the three-dimensional domain of each one of the plurality of microphones not in the largest set to be consistent with the determination of the position and the orientation of the user within the three-dimensional domain.

42. The method as in claim 39, wherein the step of determining the position and the orientation of the user within the three-dimensional domain further comprises the method of:
   determining an exact arrival time for each respective one of the plurality of voice input signals;
   calculating a delay number for each respective one of the plurality of voice input signals by cross correlating the exact arrival times for all of the plurality of voice input signals;
   computing a spherical boundary on which the user must be present, relative to the location of each respective one of the plurality of microphones as stored in the data base, responsive to the respective delay number for each reactive one of the voice input signals;
   intersecting all the spherical boundaries at a common minimal intersection, wherein said common minimal intersection defines the detected position of the user within the three-dimensional domain.

43. The method as in claim 42, wherein the step of determining the position and the orientation of the user further comprises the method of:
   analyzing the plurality of voice input signals producing respective amplitude data and respective frequency data for each of the plurality of voice input signals;
   adjusting the respective amplitude data and the respective frequency data for each of the plurality of voice input signals responsive to the triangulated position of the user;
   measuring the adjusted respective amplitude data and the adjusted respective frequency data for each of the plurality of voice input signals producing a measure of the attenuation of high frequency content for each respective voice input signal;
   comparing all the measures of attenuation of high frequency content for all respective voice input signals to determine the voice input signal having a smallest measure of high frequency attenuation;
   identifying a selected one of the plurality of microphones as corresponding to the voice input signal having the smallest measure of high frequency attenuation;
   determining a selected one of the plurality of target locations responsive to looking up the location of the selected one of the plurality of microphones in the database; and
   determining the orientation responsive to the triangulated position of the user to the selected location.

\* \* \* \* \*